(12) United States Patent
Rubinstein et al.

(10) Patent No.: US 6,755,524 B2
(45) Date of Patent: Jun. 29, 2004

(54) OPHTHALMIC OPTICAL ELEMENTS AND METHODS FOR THE DESIGN THEREOF

(75) Inventors: Jacob Rubinstein, Misgav (IL); Gershon Moshe Wolansky, Jerusalem (IL)

(73) Assignee: Inray Ltd., Upper Galilee (IL)

( * ) Notice: Subject to any disclaimer, the term of this patent is extended or adjusted under 35 U.S.C. 154(b) by 113 days.

(21) Appl. No.: 10/012,331

(22) Filed: Dec. 12, 2001

(65) Prior Publication Data

US 2003/0107706 A1 Jun. 12, 2003

(51) Int. Cl.[7] .................................................. G02C 7/02
(52) U.S. Cl. .................... 351/177; 351/159; 351/168
(58) Field of Search ........................... 351/157, 160 R, 351/160 H, 161, 168–169, 196–199, 212, 219, 246; 606/4–5; 623/6.11, 6.23–6.24, 6.27–6.29

(56) References Cited

U.S. PATENT DOCUMENTS

| | | | |
|---|---|---|---|
| 5,448,312 A | | 9/1995 | Roffman et al. ............. 351/161 |
| 5,777,719 A | | 7/1998 | Williams et al. ............. 351/212 |
| 6,082,856 A | * | 7/2000 | Dunn et al. ............. 351/160 H |
| 6,086,204 A | | 7/2000 | Magnante .................... 351/212 |
| 6,095,651 A | | 8/2000 | Williams et al. ............. 351/246 |
| 6,183,084 B1 | * | 2/2001 | Chipman et al. ............ 351/176 |
| 6,302,540 B1 | | 10/2001 | Katzman et al. ............. 351/161 |
| 6,508,812 B1 | * | 1/2003 | Williams et al. ................ 606/5 |
| 6,626,535 B2 | * | 9/2003 | Altmann ...................... 351/177 |
| 2002/0082629 A1 | * | 6/2002 | Cox et al. .................... 606/166 |

OTHER PUBLICATIONS

Pantazis Mouroulis, "Aberration and Image Quality Representation for Visual Optical Systems", Visual Instrumentation, 1999, Chapter 2, McGraw–Hill.

L. Thibos and A. Bradley, "Modeling the Refractive and Neurosensor systems of the Eye", Visual Instrumentation by Pantazis Mouroulis, 1999, Chapter 4, McGraw–Hill.

* cited by examiner

*Primary Examiner*—Jordan M. Schwartz
(74) *Attorney, Agent, or Firm*—Eitan, Pearl, Latzer & Cohen Zedek, LLP

(57) ABSTRACT

In some embodiments of the present invention, a method for designing one or more surfaces of an ophthalmic optical element for an eye suffering at least from higher order aberrations includes computing an eye model and optimizing a merit function. The eye model may be computed from data on defocus of the eye, astigmatism of the eye and the higher order aberrations. The merit function may be defined in terms of the eye model and in terms of parameters of a representation of the surfaces. The optimization of the merit function yields a set of optimized parameters which can be used to obtain a description of the surfaces. The ophthalmic optical element may be a lens for spectacles, a contact lens, an intraocular lens or a multifocal lens for spectacles. The method may also be used to design the topography of corneal tissue.

5 Claims, 4 Drawing Sheets

OPHTHALMIC OPTICAL ELEMENTS AND METHODS FOR THE DESIGN THEREOF

BACKGROUND OF THE INVENTION

Recent advances have led to techniques for measuring outside of a human eye wavefronts reflected by a central point on the retina and refracted by optical components of the eye. It would be beneficial to apply these and other advances in wavefront technology to provide methods for designing ophthalmic optical elements to improve vision.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
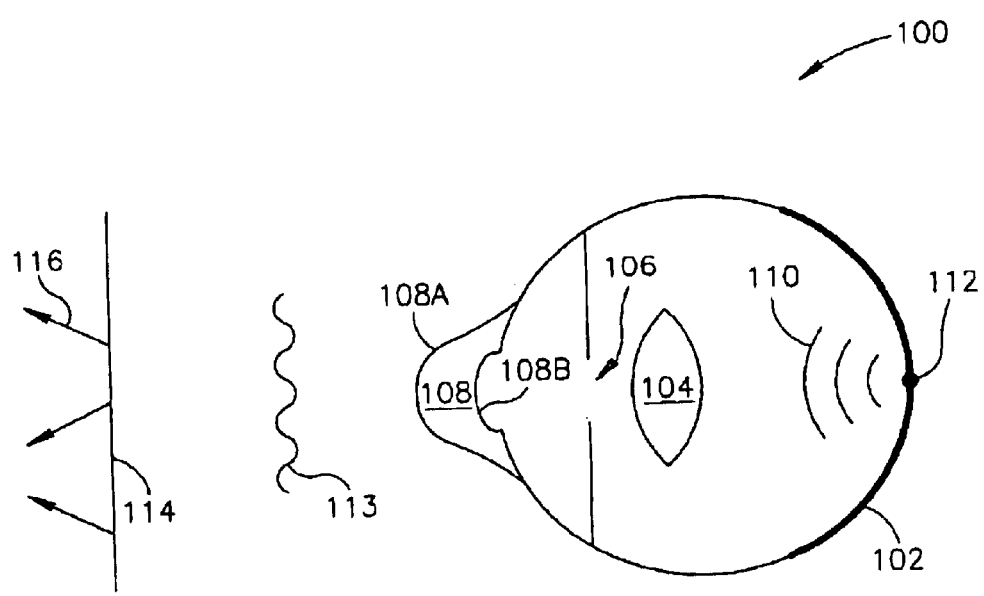
FIG. 1 is an illustration of an eye, helpful in understanding some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods and procedures have not been described in detail so as not to obscure the present invention.

Some embodiments of the present invention are directed to methods for the design of lenses for spectacles and other such ophthalmic optical elements that correct defocus, astigmatism, and higher order aberrations. In this description and in the claims, the term "higher order aberrations" is used to mean aberrations beyond defocus and astigmatism. In this description and in the claims, the term "defocus" includes the case of no defocus and the term "astigmatism" includes the case of no astigmatism. Higher order aberrations may occur in people suffering from keratoconus, in people who have undergone refractive surgery and in others.

For the sake of clarity, the description hereinbelow will be limited to lenses for spectacles. It would be obvious to those with ordinary skills in the art how to use the methods described hereinbelow to design other vision-correcting elements such as contact lenses, intraocular lenses, and the like. It would also be obvious to those with ordinary skills in the art how to use the methods described hereinbelow to design the shape of corneal tissue.

Reference is now made to FIG. 1, which is an illustration of an eye, generally referenced 100, helpful in understanding the present invention. Eye 100 comprises a retina 102, a lens 104, a pupil 106, and a cornea 108 having an anterior surface 108A and a posterior surface 108B.

Using conventional techniques, it is possible to create a spherical wavefront 110 emanating from a point 112 on retina 102 and to measure outside eye 100 the refracted wavefront 113 resulting therefrom. For example, it is possible to measure the slopes of wavefront 113 with respect to a reference plane 114 and to represent them as rays 116. Wavefront 113 has been refracted by various optical components of eye 100. Eye 100 may suffer from any or a combination of defocus, astigmatism and higher order aberrations. All these aberrations are represented in wavefront 113. In other words, the information contained in the measurement of wavefront 113 includes information about the defocus, astigmatism and higher order aberrations that eye 100 suffers.

Figure 2:
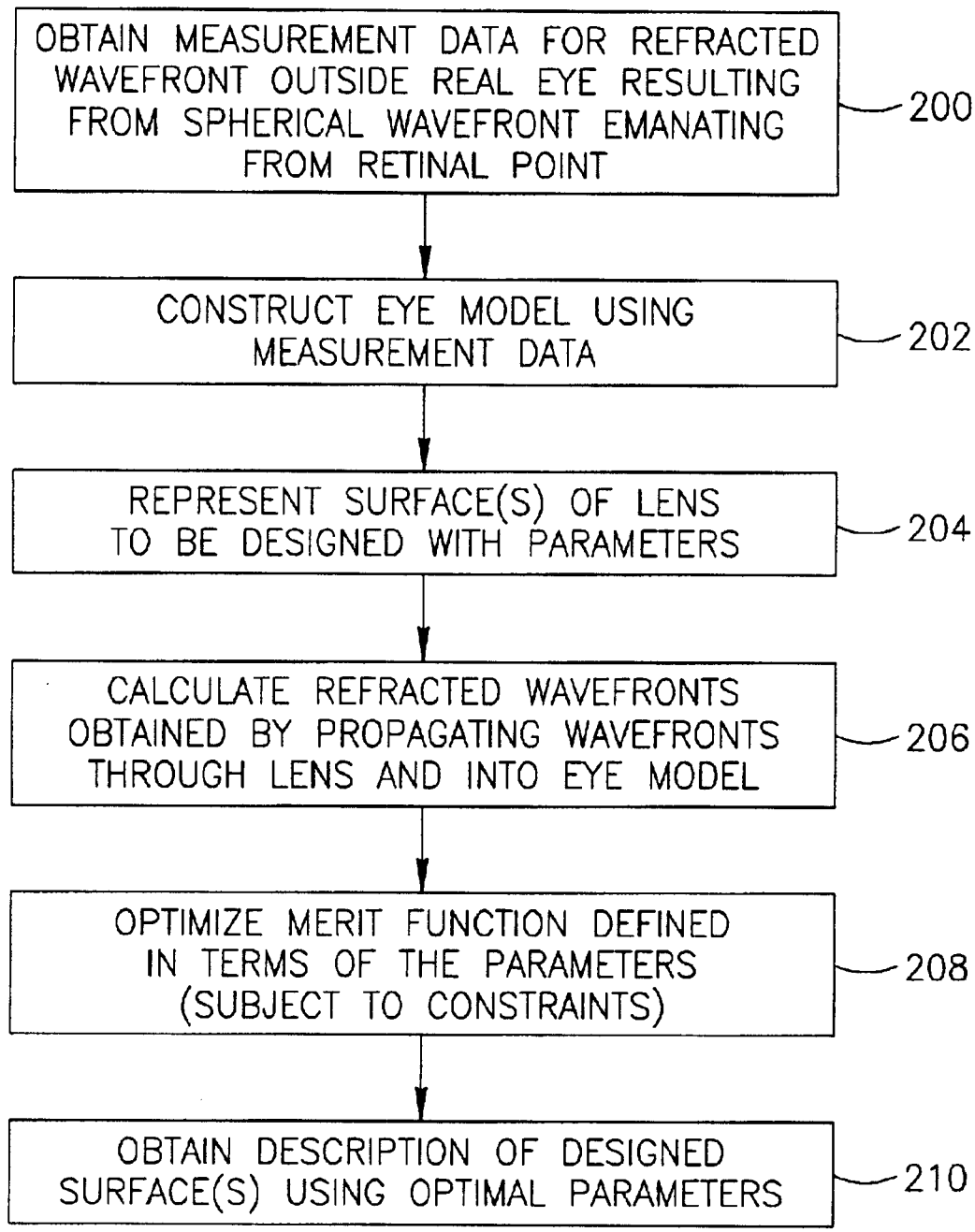
FIG. 2 is a flowchart illustration of a method for designing an ophthalmic optical element, according to some embodiments of the present invention.

Methods for designing lenses of spectacles and other ophthalmic optical elements that make use of the information contained in the measurement of the refracted wavefront will now be described. Reference is made additionally to FIG. 2, which is a flowchart illustration of a method for designing an ophthalmic optical element, according to some embodiments of the present invention. Measurement data for a refracted wavefront outside a real eye resulting from refraction by the eye of a spherical wavefront emanating from a point on the eye's retina is obtained (step 200). The data may be in the form of analytic functions, numerical values, or any other form. Often the data is only in the form of discrete values for rays representing the slopes of the refracted wavefront with respect to a reference plane.

Eye Model

The measurement data obtained in step 200 may be used to construct an eye model (step 202). There are many eye models known in the literature, and the designer of the lens may select one. Alternatively, a particular eye model may already be incorporated into computer design code.

Figure 3:
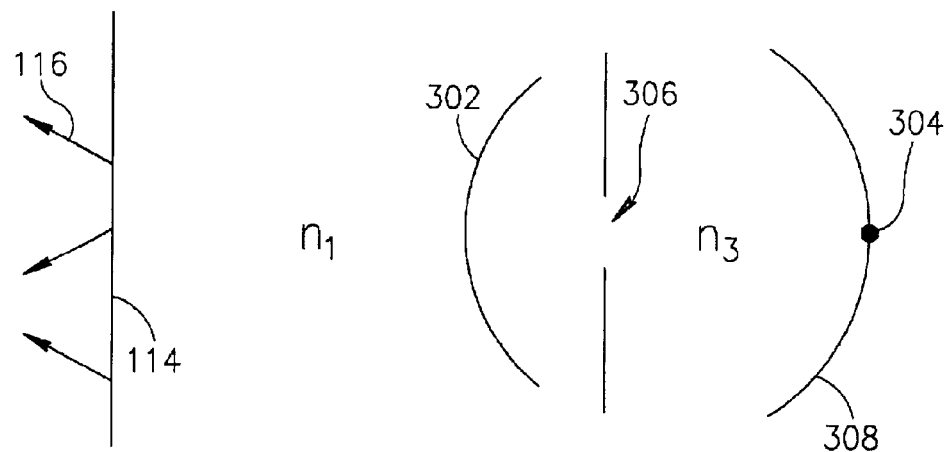
FIG. 3 is an illustration of an eye model, helpful in understanding some embodiments of the present invention.

An example of an eye model is shown in FIG. 3, to which reference is now additionally made. The eye model comprises a single refractive surface 302, a model pupil 306, a model retinal surface 308, and a retinal point 304 on model retinal surface 308. According to the eye model, the region bounded by surface 302 and model retinal surface 308 has a model refraction index $n_3$. The region outside of the eye has a model refraction index $n_1$. The width of model pupil 306 is a parameter that may be adjusted as explained hereinbelow. Computer design code then computes the surface 302 that focuses wavefront 116 (measured with respect to reference plane 114) on retinal point 304. Any of several techniques may be used to compute surface 302. For example, the methods described in U.S. patent application Ser. No. 09/718,350 entitled "METHODS FOR MEASURING AND DESIGNING OPTICAL ELEMENTS" filed Nov. 24, 2000, which is incorporated herein by reference, may be used to compute surface 302.

If additional information regarding the real eye is available, it may be incorporated into the eye model. This additional information may include the topography of the anterior corneal surface 108A, the topography of the posterior corneal surface 108B, a subjective prescription for the person for whom the lens is being designed, etc. and combinations thereof.

Figure 4:
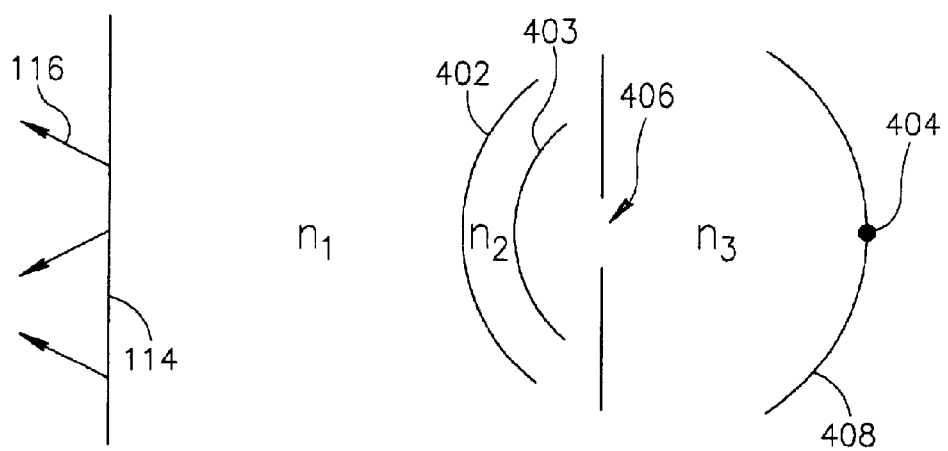
FIG. 4 is an illustration of another eye model, helpful in understanding some embodiments of the present invention.

Another example of an eye model is shown in FIG. 4, to which reference is now additionally made. The eye model comprises a first refractive surface 402, a second refractive surface 403, a model pupil 406, a model retinal surface 408, and a retinal point 404 on model retinal surface 408. According to the eye model, the region between surfaces 402 and 403 has a model refraction index $n_2$, and the region between surfaces 403 and 408 has a model refraction index $n_3$. The region outside of the eye has a model refraction index $n_1$. The width of model pupil 406 is a parameter that may be adjusted as explained hereinbelow.

If the topography of the anterior corneal surface 108A is available, then it may be substituted for surface 402, and computer design code may compute the surface 403 that focuses wavefront 116 (measured with respect to reference plane 114) on retinal point 404. Any of several techniques may be used to compute surface 403. For example, the methods described in U.S. patent application Ser. No. 09/718,350 may be used to compute surface 403. It will be appreciated by those with ordinary skills in the art that the topography of the anterior corneal surface may be incorporated into the eye model when designing one or more surfaces of a contact lens and when designing the topography of corneal tissue for use in surgery.

Alternatively, if the topography of the posterior corneal surface 108B is available, then it may be substituted for surface 403, and computer design code may compute the surface 402 that focuses wavefront 116 (measured with respect to reference plane 114) on retinal point 404. Any of several techniques may be used to compute surface 402. For example, the methods described in U.S. patent application Ser. No. 09/718,350 may be used to compute surface 402.

In another example, a subjective prescription for the person for whom the lens is being designed may be available. The subjective prescription will include subjective measurements of defocus and astigmatism. Wavefront 116 may be modified so that the aberrations calculated from the modified wavefront using standard calculations match the subjective measurements. The eye model may then be constructed so that modified wavefront 116 is focused on a point on the retina.

It will be appreciated by those of ordinary skill in the art that depending upon the additional information regarding the real eye that is available, other eye models known in the art may be constructed in step 202 from the measurement data obtained in step 200. It will also be appreciated that when modifying the methods of the invention for the design of one or more surfaces of an intraocular lens, the intraocular lens is incorporated into the eye model used in the methods.

Lens Surfaces

Figure 5:
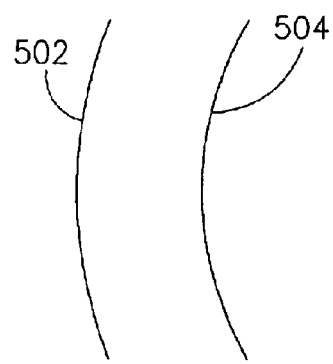
FIG. 5 is an illustration of a lens comprising two surfaces, helpful in understanding some embodiments of the present invention.

Reference is now made to FIG. 5, which is an illustration of a lens for spectacles, generally referenced 500, that is designed according to some embodiments of the present invention. Lens 500 comprises a front surface 502 and a back surface 504. In some embodiments, one of surfaces 502 and 504 is predetermined and the other surface is to be designed. In other embodiments, both surfaces 502 and 504 are to be designed. Lens 500 may comprise additional predetermined surfaces, although they are not shown in FIG. 5.

The surfaces of lens 500 that are to be designed are represented by parameters (step 204). It will be appreciated by those of ordinary skill in the art that in practice, a finite set of parameters is used, which may be denoted P. There are several ways known in the literature for representing lens surfaces. For example, the finite elements method may be used. U.S. Pat. No. 6,302,540 to Katzman et al., which is incorporated herein by reference, provides a method for representing optical surfaces by the finite elements method. U.S. patent application Ser. No. 584,715 entitled "WAVEFRONT METHOD FOR DESIGNING OPTICAL ELEMENTS" filed Jun. 1, 2000, which is incorporated herein by reference, provides the method of unconstrained patches to represent optical surfaces. Alternatively, other methods known in the art, such as the method of splines, may be used for the purpose of representing the surface or surfaces to be designed. The designer of the lens may select the method of surface representation. Alternatively, a particular method of representing the surfaces to be designed may already be incorporated into computer design code.

Merit Function and Optimization

The designer stipulates a set of point objects. Alternatively, a set of point objects may be stipulated automatically by computer design code. For example, the distances of the point objects from a central point in the eye may be specified as a function of the spatial viewing angle. Each point object emits a wavefront, and each wavefront is propagated through the lens surfaces into the eye model. Standard techniques may be used to trace each wavefront past the lens surfaces and the refracting surfaces of the eye model (step 206). The designer may adjust the eye model according to the object. For example, the designer may ascribe different pupil radii to different objects, in order to emulate the process in which the eye views different objects under different illumination conditions that lead to different pupil sizes.

A merit function that evaluates the quality of the images of the point objects on retinal surface 408 of the eye model is optimized (step 208). Several criteria for image quality are known in the art. The article "Aberration and image quality representation for visual optical systems" by P. Mouroulis (chapter 2 of the book *Visual Instrumentation*, edited by P. Mouroulis, McGraw Hill, 1999) provides several examples of such criteria, including the Strehl ratio, spot diagram size, Subjective Quality Factor, etc.

Since the image quality characteristic depends upon the point object and upon the parameter set P of the lens surfaces, it may be denoted by e(P;m), where the parameter m denotes the object. A merit function that takes into account the image quality criteria for many point objects may be defined. For example, the following merit function may be used $$G(P) = \sum_{m=1}^{M} w(m)e(P;m)$$

where m is the index of the point objects, and w(m) is a weight depending on the point object m. The object-dependent weight enables particular objects in the visual field to be emphasized in the design of the lens.

The optimization process consists of searching for those surfaces that yield the best value for the merit function. Many optimization methods are known in the art. For example, common techniques include the conjugate gradient method and the Newton method.

The optimization process may be subject to constraints. For example, the optimization process may be constrained to a parameter set P for which the lens thickness satisfies a priori requirements. Additional possible constraints include prescribed values for the surfaces and/or their derivatives at a selected set of points. The result of the optimization process is a numerical representation of all designed surfaces of the lens, derived from their optimal parameter set $\hat{P}$ (step 210).

It would be obvious to those with ordinary skills in the art how to modify the methods described hereinabove so that instead of stipulating point objects that emit spherical wavefronts, which are then propagated through the lens into the eye model, the designer or computer design code stipulates predefined wavefronts that are then propagated through the lens into the eye model.

Multifocal Design

Figure 6:
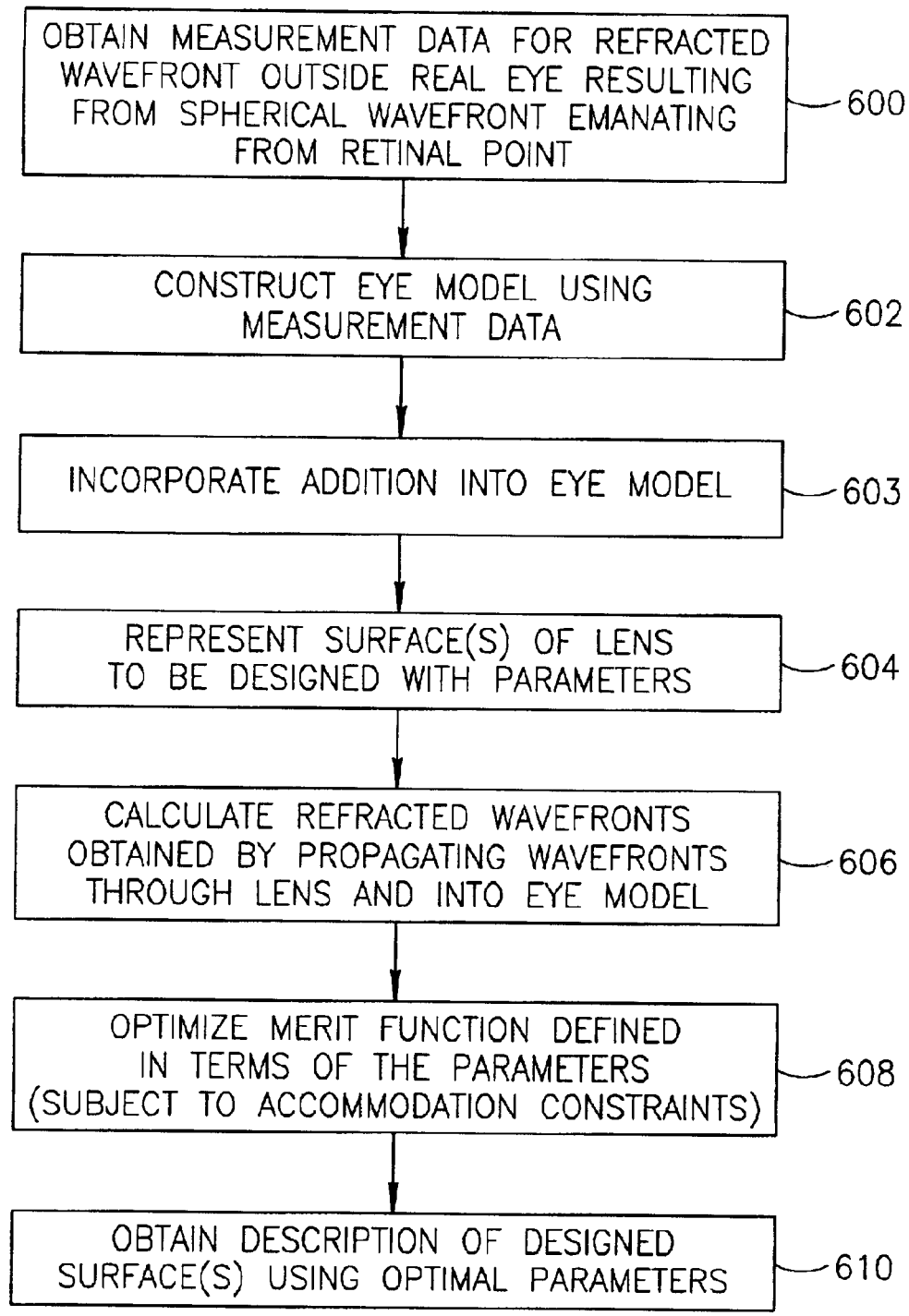
FIG. 6 is a flowchart illustration of a method for designing an ophthalmic element, according to some embodiments of the present invention.

Some embodiments of the present invention are directed towards methods for designing lenses of multifocal spectacles. Reference is made again to FIGS. 1 and 3. Reference is made additionally to FIG. 6, which is a flowchart illustration of a method for designing an ophthalmic element, according to some embodiments of the present invention. Measurement data for refracted wavefront 113 outside eye 100 resulting from wavefront 10 is obtained (step 600). The data in step 600 is obtained when the eye is focusing at a faraway object. The data may be in the form of analytic functions, numerical values, or any other form. Often the data is only in the form of discrete values for rays 116. The data for refracted wavefront 113 is used to construct a basic eye model (step 602). The basic eye model may be constructed as described hereinabove with respect to step 202 of FIG. 2. Alternatively, a more complex eye model may be constructed.

Multifocal lenses are designed to correct presbyopia. This vision defect occurs when a person is unable to accommodate sufficiently so as to focus nearby objects on the retina. The prescription for a presbyope includes a parameter called addition that characterizes the loss of accommodation ability.

The eye model constructed in step 602 is modified to incorporate the addition (step 603). For example, the accommodation process may be modeled by selecting a point object and shifting the retinal surface of the eye model to a position where the point object is best focused. For a presbyope, the accommodation is limited, thus the shift of the retinal surface is constrained. If necessary, the addition is converted to a limitation on the allowed shifts of the retinal surface of the eye model.

The designer selects a method for representing the lens surface or surfaces that are to be designed, and represents them by parameters that are denoted collectively by P (step 604, similar to step 204 of FIG. 2). To construct a merit function, the designer selects a set of point objects. In some embodiments, the point objects are selected so that nearby objects are in the lower part of the visual field, faraway objects are in the upper part of the visual field, and, in general, the location of the point objects change gradually between these two limits.

Wavefronts are emitted from the point objects. The wavefronts are traced through the lens and the optical components of the eye model (step 606, similar to step 206 of FIG. 2). The location of the retinal surface is shifted by the accommodation mechanism described hereinabove. The designer selects criteria for image quality and thus obtains a merit function G(P) for the global imaging properties of the lens-plus-eye model as a function of the lens surface parameter set P. The merit function G(P) is optimized (step 608, similar to step 208 of FIG. 2) subject to possible constraints, and a set of optimal parameters P is obtained. The designed lens surface or surfaces are obtained from the set P of optimal parameters (step 610, similar to step 210 of FIG. 2).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for designing one or more surfaces of a lens for spectacles for an eye suffering at least from higher order aberrations, the method comprising:

computing an eye model from data on defocus of said eye, astigmatism of said eye, and said higher order aberrations, said higher order aberrations including spherical aberration, coma and additional higher order aberrations;

calculating wavefronts as emanating from set of point objects, wherein said point object are at different distances and different viewing angles with respect to said eye;

optimizing a merit function defined in terms of said eye model and in terms of parameters of a representation of said surfaces, thus obtaining a set of optimized parameters; and obtaining a description of said one or more surfaces by using said set of optimized parameters in said representation, wherein said merit function characterizes visual quality criteria of images on a retina of said eye model that would be produced by said wavefronts propagated through said lens for spectacles and into said eye model.

2. The method of claim 1, wherein computing said eye model comprises:

computing said eye model from said data and from one or more of the following: a prescription of said eye, topography of at least one of corneal surfaces of said eye, and topography of at least one of the surfaces of a crystalline lens of said eye.

3. A method for designing one or more surfaces of a multifocal lens for spectacles for an eye suffering at least from higher order aberrations, the method comprising:

computing an eye model from an addition prescription of said eye and from data on defocus of said eye, astigmatism of said eye, and said higher order aberrations, said higher order aberrations including spherical aberration, coma and additional higher order aberrations;

calculating wavefronts as emanating from a set of point objects, wherein nearby point objects in said set are in a lower part of a field of vision of said eye and faraway point objects in said set are in an upper part of said field of vision; and optimizing a merit function defined in terms of said eye model and in terms of parameters of a representation of said surfaces subject to an accommodation constraint, thus obtaining a set of optimized parameters, wherein said merit function characterizes visual quality criteria of images on a retina in said eye model that would be produced by said wavefronts propagated through said multifocal lens of said spectacles and into said eye model.

4. A lens for spectacles for an eye suffering at least from higher order aberrations, the lens having one or more surfaces designed by a method comprising:

computing an eye model from data on defocus of said eye, astigmatism of said eye, and said higher order aberrations, said higher order aberrations including spherical aberration, coma and additional higher order aberrations;

calculating wavefronts as emanating from a set of point objects, wherein said point objects are at different distances and different viewing angles with respect to said eye;

optimizing a merit function defined in terms of said eye model and in terms of parameters of a representation of said surfaces, thus obtaining a set of optimized parameters; and obtaining a description of said surfaces by using said set of optimized parameters in said representation, wherein said merit function characterizes visual quality criteria of images on a retina of said eye model that would be produced by said wavefronts propagated through said lens for spectacles and into said eye model.

5. A multifocal lens for spectacles for an eye suffering at least from higher order aberrations, the multifocal lens having one or more surfaces designed by a method comprising:

computing an eye model from an addition prescription of said eye and from data on defocus of said eye, astigmatism of said eye, and said higher order aberrations, said higher order aberrations including spherical aberration, coma and additional higher order aberrations;

calculating wavefronts as emanating from a set of point objects, wherein nearby point objects in said set are in a lower part of a field of vision of said eye and faraway point objects in said set are in an upper part of said field of vision;

optimizing a merit function defined in terms of said eye model and in terms of parameters of a representation of said surfaces subject to an accommodation constraint, thus obtaining a set of optimized parameters; and obtaining a description of said surfaces by using said set of optimized parameters in said representation, wherein said merit function characterizes visual quality criteria of images on a retina of said eye model that would be produced by said wavefronts propagated through said multifocal lens for spectacles and into said eye model.

* * * * *